(12) United States Patent
Munteanu et al.

(10) Patent No.: US 7,808,652 B2
(45) Date of Patent: Oct. 5, 2010

(54) INTERFEROMETRIC MEASUREMENT OF DLC LAYER ON MAGNETIC HEAD

(75) Inventors: Florin Munteanu, Tucson, AZ (US); Dong Chen, Tucson, AZ (US); Erik Novak, Tucson, AZ (US); G. Lawrence Best, Tucson, AZ (US)

(73) Assignee: Veeco Instruments, Inc., Tucson, AZ (US)

( * ) Notice: Subject to any disclaimer, the term of this patent is extended or adjusted under 35 U.S.C. 154(b) by 300 days.

(21) Appl. No.: 12/009,424

(22) Filed: Jan. 18, 2008

(65) Prior Publication Data

US 2009/0185193 A1 Jul. 23, 2009

(51) Int. Cl.
*G01B 9/02* (2006.01)

(52) U.S. Cl. .................................................. 356/511

(58) Field of Classification Search ............... 355/504, 355/511; 356/504, 511
See application file for complete search history.

(56) References Cited

U.S. PATENT DOCUMENTS 6,404,504 B2 * 6/2002 Liu et al. ................... 356/507
7,139,081 B2 * 11/2006 De Groot ................... 356/503

* cited by examiner

*Primary Examiner*—Hwa S. A Lee
(74) *Attorney, Agent, or Firm*—Antonio R. Durando

(57) ABSTRACT

An explicit relationship is developed between the ratio of average interferometric modulation produced by diamond-like carbon (DLC)-coated magnetic-head surfaces and the thickness of the DLC layer. Accordingly, the thickness of the DLC layer is calculated in various manners from modulation data acquired for the system using object surfaces of known optical parameters.

21 Claims, 9 Drawing Sheets

| | |
|---|---|
| AIR (0) | $n_0 = 1, k_0 = 0$ |
| DLC (1) | $n_1, k_1$ |
| $Al_2O_3$ (2) | $n_2, k_2$ |

FIG. 3

| | |
|---|---|
| AIR (0) | $n_0$ |
| DLC (1) | $n_1, k_1$ |
| PT (3) | $n_3, k_3$ |

FIG. 4

MEASURE THE SAMPLE MODULATION PRODUCED BY A SAMPLE SURFACE USING AN INTERFEROMETER OPERATING WITH A PREDETERMINED ILLUMINATION INTENSITY

↓

MEASURE THE REFERENCE MODULATION PRODUCED BY A REFERENCE SURFACE USING THE SAME INTERFEROMETER AND ILLUMINATION INTENSITY

↓

ASSUMING A PREDETERMINED RELATIONSHIP BETWEEN MODULATION AND REFLECTIVITY, DERIVE A SAMPLE-MODULATION EQUATION BASED ON THE PREDETERMINED RELATIONSHIP BETWEEN THE SAMPLE MODULATION AND A VALUE OF SAMPLE REFLECTIVITY, THE SAMPLE REFLECTIVITY BEING EXPRESSED IN TERMS OF THE THICKNESS OF THE COATING LAYER AND OF KNOWN OPTICAL PARAMETERS FOR THE SAMPLE SURFACE; AND FURTHER DERIVE A REFERENCE-MODULATION EQUATION ALSO BASED ON THE SAME PREDETERMINED RELATIONSHIP BETWEEN THE REFERENCE MODULATION AND A VALUE OF REFERENCE REFLECTIVITY, THE REFERENCE REFLECTIVITY BEING EXPRESSED IN TERMS OF KNOWN OPTICAL PARAMETERS FOR THE REFERENCE SURFACE

↓

CALCULATE THE THICKNESS OF THE COATING LAYER FROM THE MEASURED SAMPLE AND REFERENCE MODULATIONS USING THE SAMPLE-MODULATION AND THE REFERENCE-MODULATION EQUATIONS.

FIG. 7

MEASURE THE SAMPLE MODULATION PRODUCED BY THE DLC-COATED AIR-BEARING SURFACE OF A MAGNETIC-HEAD SLIDER USING AN INTERFEROMETER OPERATING WITH A PREDETERMINED ILLUMINATION INTENSITY

↓

MEASURE THE REFERENCE MODULATION PRODUCED BY A REFERENCE SURFACE USING THE SAME INTERFEROMETER AND ILLUMINATION INTENSITY

↓

ASSUMING A LINEAR RELATIONSHIP BETWEEN AVERAGE MEASURED MODULATION AND ABSOLUTE VALUE OF REFLECTIVITY, DERIVE A SAMPLE-MODULATION EQUATION FOR THE SAMPLE MODULATION WHEREIN THE SAMPLE REFLECTIVITY IS EXPRESSED IN TERMS OF THE THICKNESS OF THE DLC COATING LAYER AND OF KNOWN OPTICAL PARAMETERS FOR THE AIR-BEARING SURFACE; AND FURTHER DERIVE A REFERENCE-MODULATION EQUATION FOR THE REFERENCE MODULATION WHEREIN THE REFERENCE REFLECTIVITY IS EXPRESSED IN TERMS OF KNOWN OPTICAL PARAMETERS FOR THE REFERENCE SURFACE

TAKE A RATIO OF THE SAMPLE-MODULATION EQUATION AND THE REFERENCE-MODULATION EQUATION, THEREBY PRODUCING A SINGLE EQUATION EXPRESSING SAID RATIO AS A FUNCTION OF THE THICKNESS OF THE DLC COATING LAYER

↓

TRANSFORM THE SINGLE RATIO EQUATION INTO A POLYNOMIAL EQUATION FOR THE THICKNESS OF THE DLC COATING LAYER WHEREIN THE POLYNOMIAL COEFFICIENTS ARE EXPLICIT FUNCTIONS OF SAID THICKNESS

↓

SOLVE THE POLYNOMIAL EQUATION FOR THE THICKNESS OF THE DLC COATING LAYER BY ASSUMING AN INITIAL THICKNESS VALUE, CALCULATING THE POLYNOMIAL COEFFICIENTS BASED ON THAT VALUE, SOLVING THE POLYNOMIAL BASED ON THE COEFFICIENTS SO CALCULATED TO PRODUCE A NEW THICKNESS VALUE, CALCULATING NEW POLYNOMIAL COEFFICIENTS BASED ON THE NEW THICKNESS VALUE, AND CONTINUING ITERATIVELY UNTIL A DESIRED CONVERGENCE IS REACHED

INTERFEROMETRIC MEASUREMENT OF DLC LAYER ON MAGNETIC HEAD

BACKGROUND OF THE INVENTION

1. Field of the Invention

This invention relates in general to interferometric techniques for surface characterization. In particular, it relates to a method for measuring the thickness of a layer deposited over a substrate, such as a diamond-like carbon layer over a magnetic head.

2. Description of the Related Art

In the manufacture of read/write magnetic-head sliders, precise and rapid profilometry is essential for quality control purposes. The precise height of the various slider components is critical to ensure performance and long product life. As illustrated schematically in the top view and cross-section of FIGS. 1(A) and 1(B), respectively, magnetic-head sliders include an air-bearing surface 10 (ABS) made of an aluminum-oxide/titanium-carbide composite material (often referred to as AlTiC), a read/write pole-tip region 12 (which can be made of several different materials), and a trailing-edge surface 14 made of aluminum oxide. The working distance between the air bearing surface of the slider and the disk surface affects the potential for a mechanical crash as the head flies over the disk. Similarly, the distance between the pole tip and the disk affects signal loss during read/write operations.

Therefore, standard tests carried out for quality control during manufacture of head sliders involve the measurement of the difference between the heights of the ABS surface 10 and the trailing-edge surface 14 (commonly referred to as the aluminum oxide trailing-edge recession, or ALR, parameter) and of the distance between the heights of the ABS surface 10 and the pole tip 12 (commonly referred to as the pole tip recession, or PTR, parameter). The composite ABS surface 10 is precision polished in order to render it as flat as possible for optimal functionality. Thus, the height of the ABS surface is conveniently identified for the purpose of calculating the ALR and PTR parameters by fitting a plane surface 16 to the height data obtained by means of an interferometric measurement of a predetermined ABS region. However, the composite structure and the corresponding granularity of the AlTiC material tend to produce imprecise height measurements by conventional interferometry.

Copending U.S. Ser. No. 11/824,127, hereby incorporated by reference in its entirety, discloses a novel approach to account for interferometric-measurement errors introduced by composite structures in general and AlTiC material of ABS surfaces in particular. The method involves performing an initial determination of the surface profile of the composite material using a conventional interferometric approach. The composition of the mixture constituting the composite material ($Al_2O_3$ and TiC, for example) is calculated at every pixel of the surface using an empirical relation between modulation and the absolute value of reflectivity and by assuming a linear relationship between the composite reflectivity of the composite material and the theoretical reflectivity of each constituent. An absolute value of reflectivity for the composite material is obtained from the empirical relation and the modulation measured while profiling the sample surface.

The concentration of each constituent of the composite material is then determined from the absolute value of reflectivity for the composite material and the theoretical values of reflectivity of its constituents using the assumed linear relationship. The linear relationship is subsequently also used to calculate an effective composite (complex) reflectivity for the composite material from the concentration and the theoretical reflectivity of each constituent. The phase change on reflection (PCOR), $\delta_{ij}$, at each pixel can thus be determined using the conventional theoretical relationship between phase change and reflectivity. Once the PCOR is calculated for each pixel, the initial surface profile is corrected by adding the corresponding fraction of wavelength to the height of each pixel.

In the more specific case of ALR- and PTR-parameter calculation for magnetic-head sliders, the plane surface fitted to the profile of the ABS (AlTiC) surface is corrected according to the invention. The recessions between the ABS surface and the aluminum-oxide trailing edge and between the ABS surface and the pole tip can thus be refined using a corrected reference plane calculated from actual reflectance data. This approach produces an order of magnitude improvement in the calculation of ALR and PTR parameters.

However, magnetic-head sliders are typically coated with a protective diamond-like carbon layer (referred to as a DLC layer in the art). FIG. 1(C) illustrates a head slider wherein all regions are coated with such a DLC layer of uniform thickness L. Thus, all interferometric measurements are necessarily carried out through the thin-film of DLC, which has to be accounted for in the calculation of the ALR and PTR parameters. Ser. No. 11/824,127 teaches a correction for the DLC layer when its thickness L is either known or can be assumed with some degree of precision. However, no interferometric technique is known for PCOR correction when the thickness of the DLC layer in not known with some degree of certainty, which is usually the case.

Therefore, there is still a need for an interferometric technique that allows for PCOR correction when the thickness of the DLC layer is unknown. This invention provides a straightforward solution to that problem.

BRIEF SUMMARY OF THE INVENTION

The invention is based on the recognition that a useful linear functionality can be assumed between the absolute value of reflectivity of an object surface and the modulation produced thereby during an interferometric measurement when all other system parameters remain constant. Based on this assumption, an explicit relationship between modulation and the thickness of a coating layer can be expressed using theoretical equations for the reflectivity of the object surface that depend on known optical parameters of the materials and the thickness of the coating layer. Thus, for given system operating conditions and physical characteristics (such as illumination intensity and reference mirror parameters), all quantities of such an explicit relationship are known except for the coating-layer thickness and the slope of the assumed linear relationship between modulation and reflectivity. Therefore, the thickness of the coating layer may be calculated in various manners from modulation data acquired for the system using two object surfaces of known optical parameters.

According to one approach, the modulations produced by two object surfaces (such as the DLC-coated trailing edge and the pole tip of a magnetic head) are used to develop two equations with two unknowns (the DLC-layer thickness and the slope), which can thus be solved to calculate the desired DLC thickness. According to another approach, a ratio of modulations is used, thereby canceling the slope and producing a single equation where the only unknown is the DLC thickness. This equation may be solved numerically in various manners or graphically by linear approximation.

Thus, in practice the invention is carried out by performing an initial determination of the surface profile of a DLC-coated magnetic head, thereby producing values of modulation and height for each pixel of the ABS surface, the pole-tip region, and the trailing-edge surface. The modulation values for each region are then averaged and used to calculate the DLC thickness by solving an equation that expresses modulation in function of optical parameters for the system and the thickness of the DLC layer. The thickness of the DLC layer so determined is then used to correct the height profile of the magnetic head.

Various other advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment, and particularly pointed out in the claims. However, such drawings and description disclose but a few of the various ways in which the invention may be practiced.

BRIEF DESCRIPTION OF THE DRAWINGS

FIG. 3 is schematic representation of an object surface consisting of a DLC/Trailing-Edge structure and the corresponding optical parameters used to practice the invention.

FIG. 4 is schematic representation of an object surface consisting of a DLC/Pole-Tip structure and the corresponding optical parameters used to practice the invention.

FIG. 7 is a flow chart of the broad steps involved in carrying out the invention.

FIG. 8 is a more detailed flow chart of the steps described to carry out the preferred embodiment of the invention.

DETAILED DESCRIPTION OF THE INVENTION

The invention lies in the recognition that expressing the modulation produced by the interferometric measurement of a given object surface using a system of known characteristics as a simplified linear relationship between modulation and the reflectivity of the object surface can be used advantageously to calculate the thickness of a coating layer. Using such simplified linear relationship, an explicit equation is derived for experimental modulation in function of the layer's thickness. Several techniques can then be used to calculate the thickness of the layer coating the object surface.

The invention is described throughout for convenience with regard to a uniform thin DLC layer coating a magnetic-head slider, but one skilled in the art would readily recognize that the method can be applied in the same general way to correct the interferometric profile of any surface that consists of a substrate (including a multilayer structure) that is coated with a uniform layer of known material. As used herein, the notation DCL is used to refer to the diamond-like carbon layer coating a conventional magnetic head; ABS refers to the air-bearing surface of the magnetic head; $Al_2O_3$ refers to the trailing edge surface of the magnetic head ($Al_2O_3$ being the material constituting it); and PT refers to the pole-tip surface of the magnetic head (the material constituting it varying from head to head).

Figure 1A:
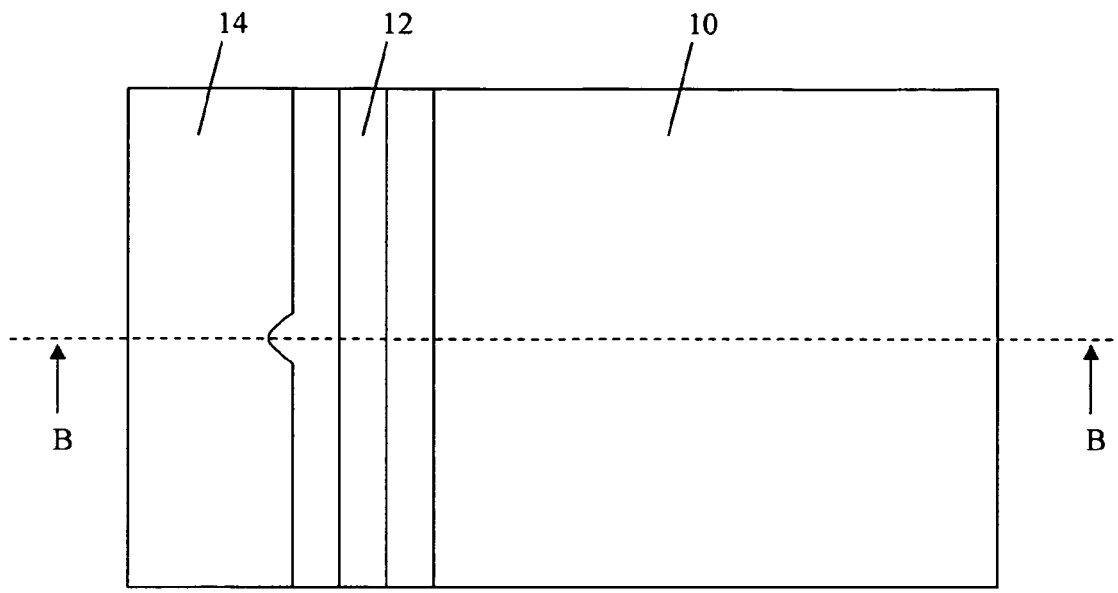
FIG. 1(A) is a schematic plan-view illustration of a magnetic-head slider include an air-bearing surface made of an aluminum-oxide/titanium-carbide composite material, a read/write pole-tip region, and a trailing-edge surface made of aluminum oxide.
Figure 1B:
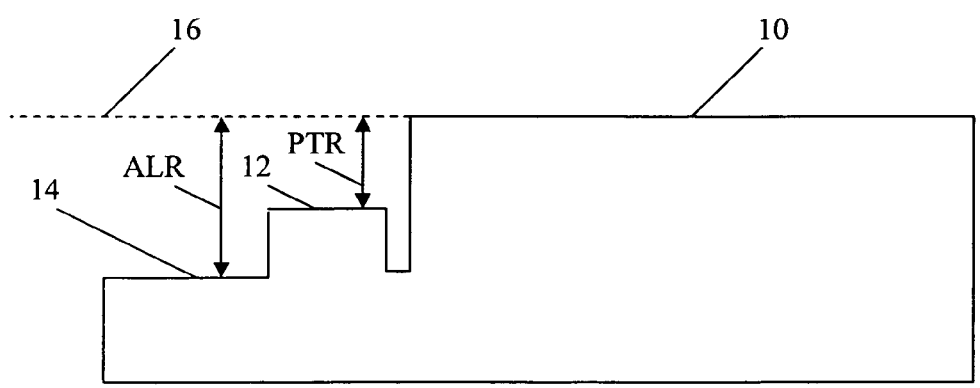
FIG. 1(B) is a cross-sectional view of the head slider of FIG. 1(A) taken along line B-B in that figure to illustrate the physical significance of the ALR and PTR parameters.
Figure 1C:
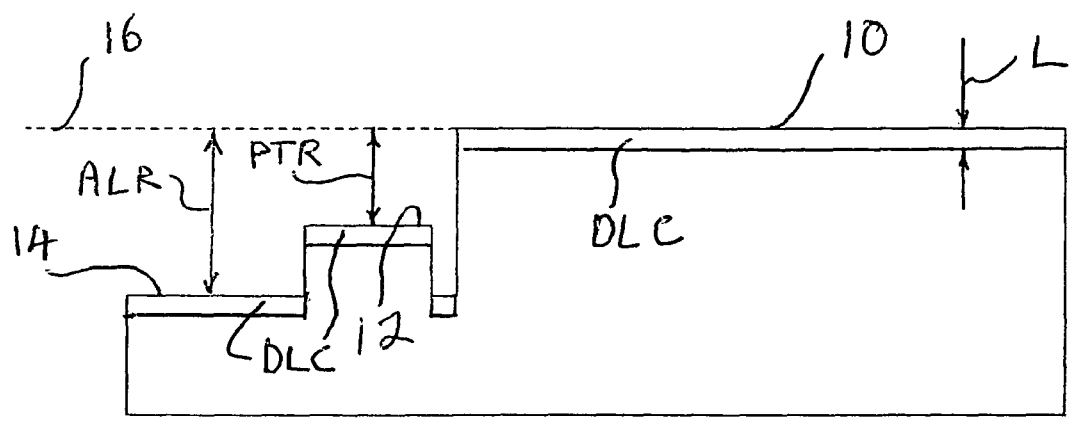
FIG. 1(C) is a cross-sectional view of the head slider of FIG. 1(A) taken along line B-B, wherein the head slider has been coated throughout with a DLC layer of uniform thickness.
Figure 2:
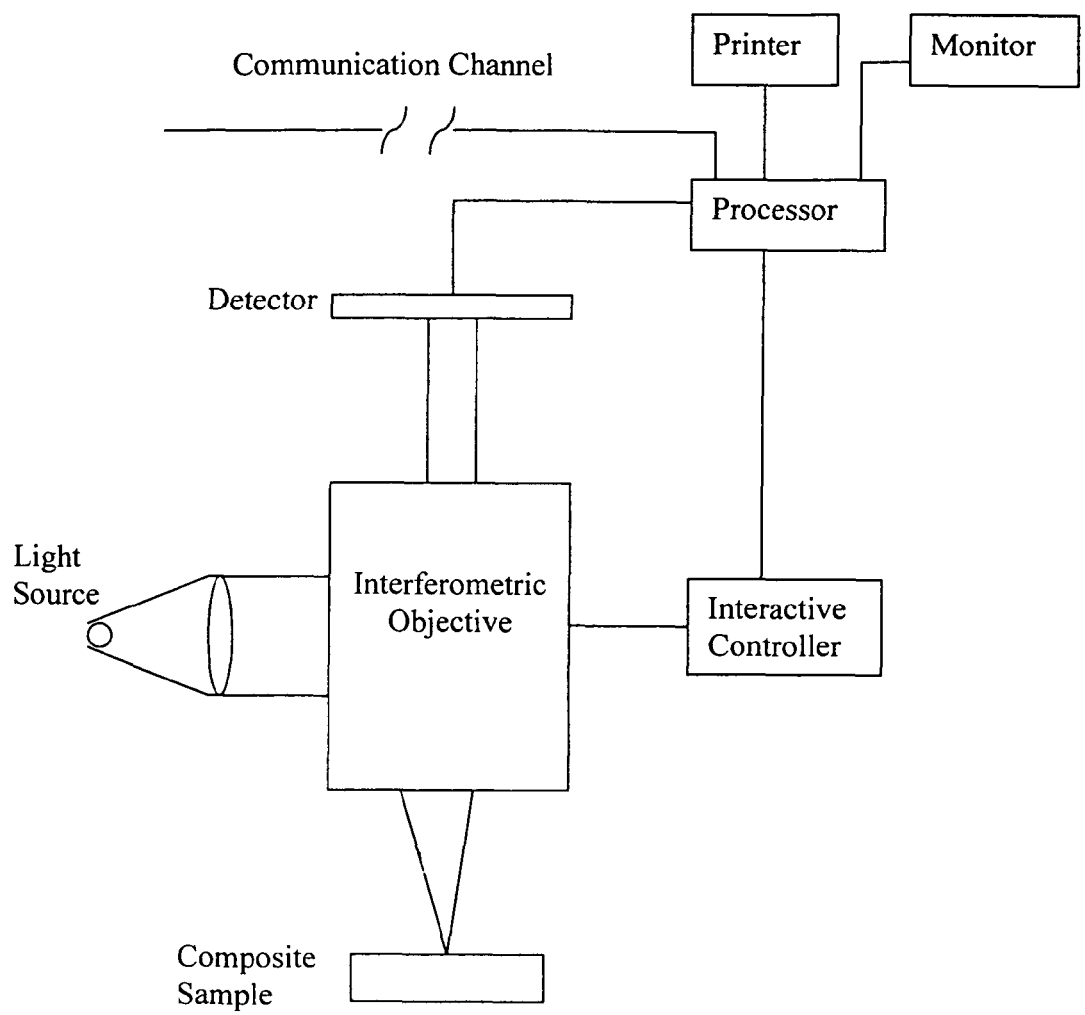
FIG. 2 is schematic representation of an interferometric profiler suitable for practicing the invention.

According to the invention, a conventional interferometric measurement is first carried out to determine phase and corresponding height at each pixel within some portions of the ABS surface, the trailing-edge surface, and the pole-tip region of a magnetic head. A conventional interferometric profilometer connected to an appropriately programmed computer may be used, as illustrated schematically in FIG. 2. As a result of this measurement, experimental height and modulation values, $H_{ij}^{exp}$ and $M_{ij}^{exp}$, respectively, are available for each measured pixel of the ABS, pole-tip and trailing-edge surfaces.

From theory, is it known that the observed experimental modulation produced by interference at each pixel is governed by the relationship $$M_{ij}^{exp} = 2I_0 |r_{ref}| \cdot |r_{obj}| - \beta, \qquad (1)$$

where $I_0$ is the intensity of illumination received by the object surface (often referred to in the art as irradiance) and the reference mirror of the interferometer in the areas corresponding to the ij pixel of the detector; $r_{ref}$ and $r_{obj}$ are the reflectivities of the reference mirror and the object surface used for the interferometric measurement, respectively; and $\beta$ is an empirical parameter that represents modulation losses in the system.

For a given interferometric system operating at a set illumination intensity, the quantity $2I_0 |r_{ref}|$ is constant. Therefore, Equation 1 may be written in function only of the absolute value of the reflectivity of the object surface, as follows:

$$M_{ij}^{exp} = \alpha |r_{obj}^{th}| - \beta, \qquad (2)$$

where $r_{obj}^{th}$ is the theoretical reflectivity of the object surface, and $\alpha$ and $\beta$ are system-dependent parameters.

The theoretical reflectivity of an object surface depends on the material and structure constituting the surface, including the DLC layer coating the substrate, if present. If the optical parameters of all materials constituting the object surface are known, the resulting reflectivity may be expressed as a function of such parameters and the thickness of the DLC layer. For example, referring to an object surface consisting of trailing-edge aluminum oxide coated with a layer of DLC material of thickness L, the relevant parameters are the various materials' indices of refraction, n and k, as illustrated schematically in FIG. 3. The theoretical reflectivity of such a $DLC/Al_2O_3$ structure, for example, would be given by the equation $$r_{DLC/Al2O3} = \frac{r_{01} + r_{12} * e^{-2i\frac{2\pi}{\lambda}(n_1 - ik_1)L}}{1 + r_{01} * r_{12} * e^{-2i\frac{2\pi}{\lambda}(n_1 - ik_1)L}}, \qquad (3)$$

where the indices 0, 1 and 2 refer to air, DLC and $Al_2O_3$, respectively.

Similarly, if the object surface is the pole tip consisting of a material of known optical parameters coated with a layer of DLC material of thickness L, as illustrated schematically in FIG. 4, the theoretical reflectivity of such a DLC/PT structure is given by the equation $$r_{DLC/PT} = \frac{r_{01} + r_{13} * e^{-2i\frac{2\pi}{\lambda}(n_1 - ik_1)L}}{1 + r_{01} * r_{13} * e^{-2i\frac{2\pi}{\lambda}(n_1 - ik_1)L}}, \quad (4)$$

where the indices 0, 1 and 3 refer to air, DLC and pole-tip material, respectively. If the optical parameters (n and k) of the materials are known, the various reflectivities can be calculated in straightforward manner from the theoretical relationships $$r_{01} = \frac{1 - n_1 + ik_1}{1 + n_1 - ik_1}, \quad (5)$$

$$r_{12} = \frac{n_1 - ik_1 - n_2 + ik_2}{n_1 - ik_1 + n_2 - ik_2}, \quad (6)$$

and $$r_{13} = \frac{n_1 - ik_1 - n_3 + ik_3}{n_1 - ik_1 + n_3 - ik_3}. \quad (7)$$

Combining all of the foregoing, Equation 2 can be written for each object surface (trailing edge and pole tip) as follows:

$$M_{ijDLC/Al2O3}^{exp} = \alpha \left| \frac{r_{01} + r_{12} * e^{-2i\frac{2\pi}{\lambda}(n_1 - ik_1)L}}{1 + r_{01} * r_{12} * e^{-2i\frac{2\pi}{\lambda}(n_1 - ik_1)L}} \right| - \beta, \text{ and} \quad (8)$$

$$M_{ijDLC/Al2O3}^{exp} = \alpha \left| \frac{r_{01} + r_{13} * e^{-2i\frac{2\pi}{\lambda}(n_1 - ik_1)L}}{1 + r_{01} * r_{13} * e^{-2i\frac{2\pi}{\lambda}(n_1 - ik_1)L}} \right| - \beta. \quad (9)$$

Noting that in theory zero reflectivity produces no modulation, it can be reasonably assumed that $\beta=0$, which reduces Equations 8 and 9 to a set of two equations with two unknowns, the slope $\alpha$ and the thickness L. (System noise tends to produce some offset, but in practice this assumption has been found to be acceptable for the purposes of the invention. Alternatively, $\beta$ may be determined by calibration of the interferometric system using surfaces of known optical parameters and a coating layer of known thickness.) Furthermore, because both object surfaces (trailing edge and pole tip) have a uniform height, an average value of modulation may be used advantageously, instead of pixel-by-pixel values, in order to reduce noise in the data acquired by interferometry. All of the above leads to the following set of equations:

$$\overline{M}_{DLC/Al2O3}^{exp} = \alpha \left| \frac{r_{01} + r_{12} * e^{-2i\frac{2\pi}{\lambda}(n_1 - ik_1)L}}{1 + r_{01} * r_{12} * e^{-2i\frac{2\pi}{\lambda}(n_1 - ik_1)L}} \right|, \text{ and} \quad (10)$$

$$\overline{M}_{DLC/PT}^{exp} = \alpha \left| \frac{r_{01} + r_{13} * e^{-2i\frac{2\pi}{\lambda}(n_1 - ik_1)L}}{1 + r_{01} * r_{13} * e^{-2i\frac{2\pi}{\lambda}(n_1 - ik_1)L}} \right|, \quad (11)$$

where $\overline{M}^{exp}$ is an average modulation measured experimentally over the surface of interest. Various kinds of average, including a median value of modulation, were used during the course of developing the method of the invention, but they all produced similar results. Therefore, the type of average utilized is not critical.

It is clear that solving the system of Equations 10 and 11 yields the value L of the thickness of the DLC layer. L can then by used directly to correct the heights $H_{ij}^{exp}$ originally measured interferometrically for the ABS, trailing edge and pole tip, as well as the recesses ALR and PTR. The following detailed procedures illustrate various methods for the calculation of L from these equations.

According to one aspect of the invention, the ratio of Equations 10 and 11 is taken to produce an explicit equation with a single unknown, L, as follows (wherein the exponent "exp" is dropped for convenience, being understood that the modulations in question are the experimental modulations obtained from the interferometric measurement):

$$Z = \frac{\overline{M}_{DLC/Al2O3}}{\overline{M}_{DLC/PT}} \quad (12)$$

$$= \left| \frac{r_{01} + r_{12} * e^{-\frac{4\pi}{\lambda}k_1 L} e^{-i\frac{4\pi}{\lambda}n_1 L}}{1 + r_{01} * r_{12} * e^{-\frac{4\pi}{\lambda}k_1 L} e^{-i\frac{4\pi}{\lambda}n_1 L}} * \frac{1 + r_{01} + r_{13} * e^{-\frac{4\pi}{\lambda}k_1 L} e^{-i\frac{4\pi}{\lambda}n_1 L}}{r_{01} * r_{13} * e^{-\frac{4\pi}{\lambda}k_1 L} e^{-i\frac{4\pi}{\lambda}n_1 L}} \right|,$$

wherein Z is the ratio of Equations 10 and 11; that is, a known number equal to the ratio of average modulations. All parameters are known (through the use of Equations 5-7) except for the DLC thickness L. Accordingly, Equation 12 can be solved numerically, for instance, by assuming a value for L (zero, for example), calculating the ratio on right side of the equation, and comparing it to the measured ratio Z. L can then be increased step-wise (to $L_1, L_2, \ldots, L_{n-1}, L_n, L_{n+1}$) until the measured ratio Z is bounded by two consecutive calculated ratios (corresponding to $L_n$ and $L_{n+1}$ values, for example). Knowing that the solution for L lies between $L_n$ and $L_{n+1}$, the process may then be refined to the degree desired simply by repeating the exercise while incrementing the height value $L_n$ with fractions of the interval between $L_n$ and $L_{n+1}$. Obviously, the solution for L can be refined to the degree desired simply by selecting smaller and smaller increments within current boundaries.

Figure 5:
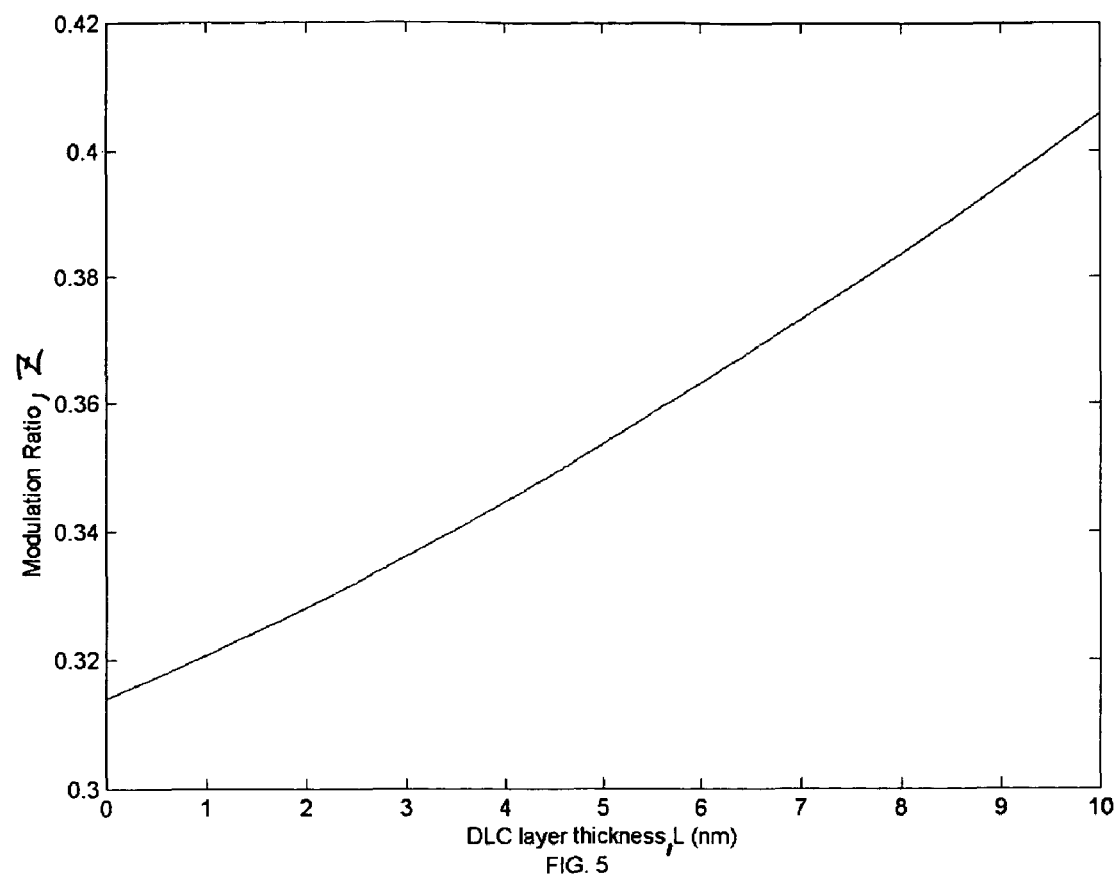
FIG. 5 is a plot illustrating the quasi-linear relationship between the ratio of modulations measured from the trailing edge and the pole tip and the thickness of the DLC layer over them.

According to another aspect of the invention, the right-hand side of Equation 12 is plotted as a function of L, where L varies from 0 to a large enough value to cover the expected thickness of the coating layer, as illustrated by the curve of FIG. 5 (for example, DLC layers typically vary between 1 and 3 nm). Once such a curve is generated, the thickness of the DLC layer involved in the particular measurement can be obtained simply by finding the L value corresponding to the measured ratio Z. Furthermore, because it was discovered that for small DLC-layer thicknesses (e.g., <5 nm) the relation between the ratio of modulation and DLC thickness is approximately linear, Equation 12 may be reduced to a family of substantially linear plots wherein each curve corresponds to a set of optical parameters for the materials of interest. Thus, for a given material, the thickness L can be determined graphically in straightforward manner simply by finding the thickness corresponding to the measured modulation ratio on the appropriate curve.

Another approach for the solution of Equation 12 lies in a series of transformations that reduce it to a polynomial that can be solved rapidly by sequential iterations. Introducing the substitution $$y \equiv \frac{4\pi}{\lambda} n_1 L$$

and utilizing Euler's formula, Equation 12 may be written in trigonometric form as follows, $$A\sin(2y) + B\cos(2y) + C\sin(y) + D\cos(y) + E = 0, \quad (13)$$

where the coefficients A, B, C, D and E are known relations expressed in terms of explicit dependence on the DLC thickness L. Introducing the further substitution $$t \equiv \tan\frac{y}{2},$$

the trigonometric equation may be transformed in a polynomial equation of the fourth order, as follows:

$$t^4(B-D+E) + t^3(-4A+2C) + t^2(-6B+2E) + t(4A+2C) + (B+D+E) = 0, \quad (14)$$

where t as well as A, B, C, D and E depend on the DLC thickness L. The step-by-step derivations of Equations 13 and 14 are not illustrated here because they entail mere substitutions and algebraic manipulations of the various quantities expressed in Equations 5-7 and 12. However, it is clear that all coefficients in Equation 14 are explicit functions of L.

Therefore, Equation 14 may be solved iteratively in straightforward manner by assuming a value for L (L=0, for example) and calculating a starting set of values for A, B, C, D and E. These are then used to solve the 4th order polynomial Equation 14 for t, which of course will yield four alternative solutions. The largest positive solution, $t_{max}$, is used initially to calculate a value of L from the equation $$t_{max} = \tan\frac{2\pi n_1 L}{\lambda}, \quad (15)$$

which reflects the two variable substitutions adopted in the development of Equation 14. The maximum t value is preferably used to ensure a positive value and also because it was found to produce a more rapid convergence to the solution. Using the newly determined value for L, a new set of values for A, B, C, D and E is calculated and Equation 14 is solved again for a new value of $t_{max}$. The procedure is repeated iteratively until two consecutive values of L vary by less than a predetermined amount. This procedure has been found to converge very rapidly to $\pm 10^{-7}$ nm within 6 iterations. Therefore, it is preferred.

The methods disclosed above are particularly useful in the measurement of magnetic heads because the modulation data required to calculate the thickness of the DLC layer are also required to calculate pole-tip and trailing-edge recesses. Therefore, they do not require additional measurements. However, when that is not the case or when an additional measurement is tolerated, the process may be simplified by using the modulation generated by an uncoated surface. For example, an uncoated reference surface (an external sample surface, not to be confused with the reference mirror of the interferometer) could be used as the second object surface to generate interferometric data in addition to the modulation obtained from the trailing-edge surface. In such case, the pertinent ratio equation becomes $$Z = \frac{\overline{M}_{DLC/Al2O3}}{\overline{M}_{ref}} \quad (16)$$

$$= \left| \frac{r_{01} + r_{12} * e^{-\frac{4\pi}{\lambda}k_1 L} e^{-i\frac{4\pi}{\lambda}n_1 L}}{1 + r_{01} * r_{12} * e^{-\frac{4\pi}{\lambda}k_1 L} e^{-i\frac{4\pi}{\lambda}n_1 L}} * \frac{1}{r_{Ref}} \right|,$$

which is simpler in form than Equation 12. As one skilled in the art would readily understand, $r_{Ref}$ is calculated from the expression $$r_{Ref} = \frac{1 - n_4 + ik_4}{1 + n_4 - ik_4}, \quad (17)$$

where the index 4 refers to the material constituting the reference surface. Equation 13 may be solved using any of the methods described above with reference to Equation 12.

Thus, the method of the invention allows the calculation of the thickness of a coating layer deposited over a surface of interest profiled by interferometry. Once the thickness of the layer is known, appropriate correction to the profiled generated by interferometry may be made in straightforward manner. In particular, the method has shown great usefulness in measuring the thickness of DLC layers deposited over magnetic-head structures of various kinds, thereby allowing a refinement of the profile data to a degree of precision previously unattained with interferometric measurements. Specifically, when used to correct the profile of the DLC-coated ABS surface of a conventional magnetic-head slider, the method of the invention has been found to repetitively yield surface measurements (and therefore ALR and PTR measurements) with a level of precision in the order of 0.55 nm RMS or better, which is a further advance over the results produced by the correction procedure described in Ser. No. 11/824,127. As a result, the ALR and PTR parameters calculated using the method of the invention when a DLC layer of unknown thickness is present are greatly improved.

Figure 6:
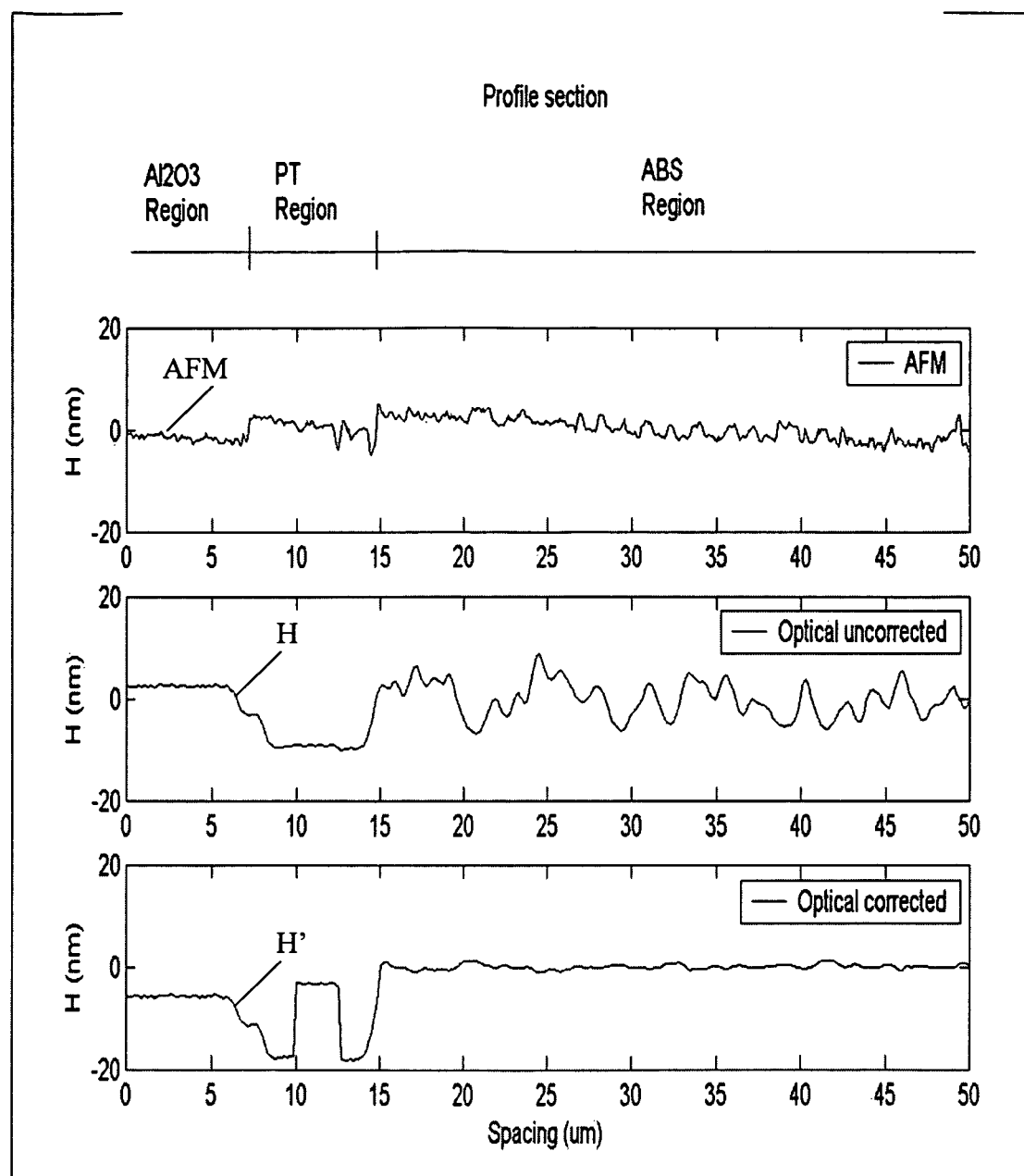
FIG. 6 illustrates the effectiveness of the correction method of the invention by comparing the profiles obtained by atomic force microscopy, conventional interferometry, and interferometry corrected according to the invention.

For illustration, FIG. 6 shows the cross-sectional profile (denoted as AFM) of a typical DLC-coated head slider obtained with an atomic force microscope (taken as the true profile and used for reference for comparison purposes), the corresponding profile H obtained with conventional profilometry without correction, and the corrected profile H' produced by the method of the invention through calculation of the thickness of the DLC layer. The figure shows that the uncorrected profile on average differs from the AFM reference data by several nanometers, while the correction process of the invention produced a profile that is substantially true to the AFM profile. As a result, the average PTR improvement was about 18 nm (from −18.26 nm to −0.2 average discrepancy with a DLC layer thickness of 2.7 nm). While the improvement for any given run depends on the DLC layer thickness and the specific optical parameters of the materials, similar results have been produced with predictable repetitiveness with a variety of different sample materials.

FIG. 7 illustrates in broad descriptive terms the essential steps required to carry out the invention. FIG. 8 is a flow chart of the more specific steps that can be used to practice the invention in the preferred form, as described above.

The invention has been shown and described herein in terms of a DLC-coated single-layer substrate structure (i.e., DLC-coated air-bearing, trailing-edge, pole-tip, and external reference surfaces). However, often these substrate structures include additional layers, such as a so-called fixing silicon layer under the DLC layer. In such cases, the invention can be carried out as described simply by using equivalent optical parameters for the multilayer substrate structure. Those skilled in the art will recognize that these may be calculated theoretically so long as the composition, the thickness, and the specific optical parameters of each layer constituting the structure are known.

Those skilled in the art will also readily recognize that the technique of the invention can be used advantageously for other purposes, such as, for example, determining the local (pixel-by-pixel) thickness of a non-uniform layer coating a substrate. This would be done by using an uncoated reference surface and solving Equation 16 using the modulation measured at each pixel of interest of the coated surface.

Note also that the invention has been described using a linear, zero-intercept, relationship between modulation and absolute value of reflectivity (derived from Equation 2) because such functionality has proven to be advantageous for the objective of the invention. However, any other empirical or theoretical relationship that could be reduced to an explicit expression of modulation (or a ratio of modulation) as a function of thickness of a coating layer (such as the DLC layer) would be acceptable to practice the invention following the same procedure described herein. Finally, reflectivity is the optical property described for the various steps used to practice invention, but the approach would be equally viable if another optical property affecting PCOR for which an empirical equation relating it to modulation could be written. The same series of steps would lead to the calculation of the thickness of the coating layer, which in turn could be used to correct the measured interferometric profile of the coated surface. For instance, if a material is partially transmissive, transmissivity and its theoretical relationship to modulation could be used to define a different empirical equation with different parameters that could be determined by solving the equation with information from known materials. Thus, in essence, the important advance of the invention is the technique that allows calculation of the unknown thickness of a coating layer based on measured modulation and known optical properties of the materials in the system. Similarly, the details described to solve the various equations illustrate only some of the various ways in which the invention can be implemented.

Therefore, the invention is not to be limited to the details disclosed herein but is to be accorded the full scope of the claims so as to embrace any and all equivalent processes and products.

The invention claimed is:

1. An interferometric method for profiling a sample surface covered with a coating layer, the method comprising the following steps:

measuring a sample modulation produced by the sample surface using an interferometer operating with a predetermined illumination intensity;

measuring a reference modulation produced by a reference surface using said interferometer and illumination intensity;

calculating a thickness of said coating layer from said sample and reference modulations; and correcting a height calculated from said sample modulation by accounting for said thickness of the coating layer at each of a plurality of pixels of the sample surface;

wherein said calculating step is carried out assuming a predetermined relationship between an average modulation and reflectivity, thereby producing a sample-modulation equation based on said predetermined relationship between an average of the sample modulation and a value of sample reflectivity, said sample reflectivity being expressed in terms of the thickness of the coating layer and of known optical parameters for the sample surface; and further producing a reference-modulation equation also based on said predetermined relationship between an average reference modulation and a value of reference reflectivity, said reference reflectivity being expressed in terms of known optical parameters for the reference surface.

2. The method of claim 1, wherein said predetermined relationship is a linear relation between said average modulation and an absolute value of reflectivity, and said calculating step further includes taking a ratio of the sample-modulation equation and the reference-modulation equation, thereby producing a single equation expressing said ratio as a function of the thickness of the coating layer.

3. The method of claim 2, wherein said single equation is solved iteratively.

4. The method of claim 2, wherein said single equation is solved graphically.

5. The method of claim 1, wherein said sample surface is a coated surface of a magnetic-head slider.

6. An interferometric method for measuring a thickness of a diamond-like carbon layer coating a magnetic-head slider, the method comprising the following steps:

measuring a sample modulation produced by a sample surface on the magnetic-head slider using an interferometer operating with a predetermined illumination intensity;

measuring a reference modulation produced by a reference surface using said interferometer and illumination intensity;

calculating a thickness of said diamond-like carbon layer from said sample and reference modulations;

wherein said calculating step is carried out assuming a predetermined relationship between an average modulation and reflectivity, thereby producing a sample-modulation equation based on said predetermined relationship between an average of the sample modulation and a value of sample reflectivity, said sample reflectivity being expressed in terms of the thickness of the diamond-like carbon layer and of known optical parameters for the sample surface; further producing a reference-modulation equation also based on said predetermined relationship between an average of the reference modulation and a value of reference reflectivity, said reference reflectivity being expressed in terms of known optical parameters for the reference surface; and wherein the reference surface is a second surface on the magnetic-head slider.

7. The method of claim 6, wherein said predetermined relationship is a linear relation between said average modulation and an absolute value of reflectivity, and said calculating step further includes taking a ratio of the sample-modulation equation and the reference-modulation equation, thereby producing a single equation expressing said ratio as a function of said thickness of the diamond-like carbon layer.

8. The method of claim 7, wherein said sample surface is an air-bearing surface of the magnetic-head slider and said second surface is a pole-tip surface of the magnetic-head slider.

9. The method of claim 8, further including the step of using said thickness of the diamond-like carbon layer to refine a pole-tip recession measurement for the magnetic-head slider.

10. The method of claim 7, wherein said sample surface is an air-bearing surface of the magnetic-head slider and said second surface is a trailing-edge surface of the magnetic-head slider.

11. The method of claim 10, further including the step of using said thickness of the diamond-like carbon layer to refine a trailing-edge recession measurement for the magnetic-head slider.

12. An interferometric method for measuring a thickness of a diamond-like carbon (DLC) layer coating a magnetic-head slider, the method comprising the following steps:
measuring an air-bearing modulation produced by a DLC-coated air-bearing surface of the magnetic-head slider using an interferometer operating with a predetermined illumination intensity;
measuring a reference modulation produced by a DLC-coated reference surface on the magnetic-head slider using said interferometer and illumination intensity;
calculating a thickness of the diamond-like carbon layer assuming a linear relation between an average of modulation and an absolute value of theoretical reflectivity, thereby using an air-bearing modulation equation based on said linear relation between an average of the air-bearing modulation and an absolute value of theoretical reflectivity for said air-bearing surface, wherein the theoretical reflectivity for the air-bearing surface is expressed in terms of the thickness of the diamond-like carbon layer and of known optical parameters for the air-bearing surface; further using a reference modulation equation that is also based on said linear relation between an average of said reference modulation and an absolute value of theoretical reflectivity for said reference surface, wherein the theoretical reflectivity for the reference surface is expressed in terms of the thickness of the diamond-like carbon layer and of known optical parameters for the reference surface; and taking a ratio of the air-bearing modulation equation and the reference modulation equation, thereby producing a single equation expressing said ratio as a function of said thickness of the diamond-like carbon layer.

13. The method of claim 12, wherein said reference surface is a pole-tip surface of the magnetic-head slider.

14. The method of claim 13, further including the step of using said thickness of the diamond-like carbon layer to refine a pole-tip recession measurement for the magnetic-head slider, thereby achieving a pole-tip recession measurement with an accuracy of 0.55 nm RMS or better.

15. The method of claim 12, wherein said reference surface is a trailing-edge surface of the magnetic-head slider.

16. The method of claim 15, further including the step of using said thickness of the diamond-like carbon layer to refine a trailing-edge recession measurement for the magnetic-head slider, thereby achieving a trailing-edge recession measurement with an accuracy of 0.55 nm RMS or better.

17. An interferometric method for measuring a thickness of a coating layer over a substrate, the method comprising the following steps:
measuring a substrate modulation produced by a substrate surface coated with said coating layer using an interferometer operating with a predetermined illumination intensity;
measuring a reference modulation produced by a reference surface coated with the coating layer using said interferometer and illumination intensity;
calculating a thickness of the coating layer assuming a linear relation between an average of modulation and an absolute value of theoretical reflectivity, thereby using a substrate modulation equation based on said linear relation between an average of the substrate modulation and an absolute value of theoretical reflectivity for said substrate surface, wherein the theoretical reflectivity for the substrate surface is expressed in terms of the thickness of the coating layer and of known optical parameters for the substrate surface; further using a reference modulation equation that is also based on said linear relation between an average of said reference modulation and an absolute value of theoretical reflectivity for said reference surface, wherein the theoretical reflectivity for the reference surface is expressed in terms of the thickness of the coating layer and of known optical parameters for the reference surface; and taking a ratio of the substrate modulation equation and the reference modulation equation, thereby producing a single equation expressing said ratio as a function of said thickness of the coating layer.

18. The method of claim 17, wherein said substrate is a multilayer substrate structure, said theoretical reflectivity is an equivalent reflectivity for the multilayer substrate structure, and said optical parameters are equivalent optical parameters for the multilayer substrate structure.

19. Interferometric apparatus for profiling a sample surface covered with a coating layer, the apparatus comprising:
an interferometer for measuring a sample modulation produced by the sample surface using a predetermined illumination intensity, for determining a corresponding height at each of a plurality of pixels over the sample, and for measuring a reference modulation produced by a reference surface using said illumination intensity;
means for calculating a thickness of said coating layer from said sample and reference modulations; and
means for correcting said height at each of said plurality of pixels by adding said thickness of the coating layer;
wherein said calculating means includes a predetermined relation between an average modulation and reflectivity, thereby producing a sample-modulation equation based on said predetermined relation between an average of the sample modulation and a value of sample reflectivity, said sample reflectivity being expressed in terms of the thickness of the coating layer and of known optical parameters for the sample surface; and further producing a reference-modulation equation also based on said predetermined relation between an average of the reference modulation and a value of reference reflectivity, said reference reflectivity being expressed in terms of known optical parameters for the reference surface.

20. The apparatus of claim 19, wherein said predetermined relationship is a linear relation between an average modulation and an absolute value of reflectivity, and said calculating means includes a ratio of the sample-modulation equation and the reference-modulation equation, thereby utilizing a single equation expressing said ratio as a function of the thickness of the coating layer.

21. The apparatus of claim 19, wherein said sample surface is a coated surface of a magnetic-head slider.

* * * * *